(12) United States Patent
Kimura et al.

(10) Patent No.: US 11,300,426 B2
(45) Date of Patent: Apr. 12, 2022

(54) ENCODER

(71) Applicant: DMG MORI CO., LTD., Nara (JP)

(72) Inventors: Akira Kimura, Nara (JP); Takashi Uchida, Nara (JP)

(73) Assignee: DMG MORI CO., LTD., Nara (JP)

( * ) Notice: Subject to any disclaimer, the term of this patent is extended or adjusted under 35 U.S.C. 154(b) by 376 days.

(21) Appl. No.: 16/275,552

(22) Filed: Feb. 14, 2019

(65) Prior Publication Data

US 2019/0277664 A1 Sep. 12, 2019

(30) Foreign Application Priority Data

Mar. 8, 2018 (JP) .............................. JP2018-041576

(51) Int. Cl.
*G01D 5/244* (2006.01)
(52) U.S. Cl.
CPC ..................................... *G01D 5/244* (2013.01)
(58) Field of Classification Search
CPC . G01D 5/244; G01D 5/24409; G01D 5/24419
See application file for complete search history.

(56) References Cited

U.S. PATENT DOCUMENTS

| | | | | |
|---|---|---|---|---|
| 5,065,263 A | * | 11/1991 | Yoshida | G11B 21/106 360/77.03 |
| 9,802,619 B2 | * | 10/2017 | Denda | B60W 40/101 |
| 2003/0160160 A1 | * | 8/2003 | Taniguchi | H03M 1/1038 250/231.13 |
| 2008/0117992 A1 | * | 5/2008 | Murokita | G01D 5/2449 375/250 |

(Continued)

FOREIGN PATENT DOCUMENTS

| | | |
|---|---|---|
| JP | H6-18547 A | 1/1994 |
| JP | H0697823 A | 4/1994 |

(Continued)

OTHER PUBLICATIONS

Wikipedia: Kinematics < https://en.wikipedia.org/w/index.php?title=Kinematics&oldid=828890836 > version dated Mar. 4, 2018. (Year: 2018).*

(Continued)

*Primary Examiner* — Raymond L Nimox
(74) *Attorney, Agent, or Firm* — von Briesen & Roper, s.c.

(57) ABSTRACT

An encoder includes a scale having a pattern to be detected, a detecting sensor outputting a signal corresponding to the pattern, a position calculator calculating a relative position between the scale and the detecting sensor based on the signal, a position data storage storing the calculated position data, and a position estimator estimating a relative position between the scale and the detecting sensor at a calculation-target time point based on the stored position data. The position estimator estimates the position at the calculation-target time point based on positions at first and second time points each preceding the calculation-target time point by a predetermined time. The position estimator processes position data in a first time width centered on the first time point and position data in a second time width centered on the second time point to calculate the positions at the first and second time points.

9 Claims, 3 Drawing Sheets

(56) References Cited

U.S. PATENT DOCUMENTS

| | | | |
|---|---|---|---|
| 2009/0037127 A1 | 2/2009 | Tiemann | |
| 2011/0303831 A1* | 12/2011 | Nagura | G01D 5/3473 |
| | | | 250/231.14 |
| 2012/0116715 A1* | 5/2012 | Yoshitake | G01D 5/24409 |
| | | | 702/150 |
| 2013/0335063 A1* | 12/2013 | Francescon | G01P 3/66 |
| | | | 324/176 |
| 2014/0257731 A1* | 9/2014 | Konda | G01C 25/00 |
| | | | 702/89 |
| 2016/0202089 A1 | 7/2016 | Leoncavallo et al. | |
| 2017/0356766 A1* | 12/2017 | Michelitsch | G01D 5/24476 |
| 2018/0041231 A1* | 2/2018 | Kondou | H03M 13/33 |
| 2019/0368902 A1* | 12/2019 | Utermoehlen | G01D 5/142 |

FOREIGN PATENT DOCUMENTS

| | | |
|---|---|---|
| JP | 2009037617 A | 2/2009 |
| JP | 2012110215 A | 6/2012 |
| JP | 2014-190905 A | 10/2014 |
| JP | 2016522420 A | 7/2016 |

OTHER PUBLICATIONS

Wikipedia: Jerk (physics) < https://en.wikipedia.org/w/index.php?title=Jerk_(physics)&oldid=825493417> version dated Feb. 13, 2018. (Year: 2018).*

* cited by examiner

ENCODER

FIELD OF THE DISCLOSURE

The present disclosure relates to an encoder detecting a position of an object or the like.

BACKGROUND OF THE DISCLOSURE

Conventionally known examples of encoders include a rotary encoder detecting a rotational angular position of a motor or the like (see Japanese Unexamined Patent Application Publication No. H6-18547) and a linear encoder detecting a moving position of an object on a linear axis of movement or the like.

Such encoders are typically configured to include a scale having formed thereon a pattern to be detected corresponding to graduations, a detecting sensor detecting the pattern to be detected formed on the scale and outputting a detection signal corresponding to the detected pattern to be detected, and a position calculator calculating a relative positional relation between the scale and the detecting sensor based on the detection signal output from the detecting sensor, the scale and the detecting sensor being provided to be relatively movable.

Conventionally known examples of a rotary encoder as described above include a separate-type rotary encoder as shown in FIG. 5 and a unit-type rotary encoder as shown in FIG. 6.

The example rotary encoder 100 shown in FIG. 5 is, for example, composed of a scale 101 having a ring shape and attached to an appropriate rotary body, and a detecting head 102 fixed to face an outer peripheral surface of the scale 101. The scale 101 has graduations as a pattern to be detected on the peripheral surface thereof, the graduations being formed in parallel to a center axis of the scale 101 and at predetermined pitch intervals.

The detecting head 102 has a detecting sensor and a position calculator incorporated therein. The detecting sensor detects a relative rotational angular position between the scale 101 rotating and the detecting sensor, and the position calculator calculates a current rotational angular position of the scale 101 with respect to a predetermined zero-point angular position (rotation zero point) based on the relative rotational angular position detected by the detecting sensor and outputs a signal (data) relating to the calculated angular position to the outside.

On the other hand, the unit-type rotary encoder 110 shown in FIG. 6 has, for example, a configuration in which a ring-shaped scale and a detecting head, which are similar to those of the separate-type rotary encoder 100 described above, are contained in a predetermined casing 111. The ring-shaped scale is rotatably supported in the casing 111 and the detecting head is fixed to face the outer peripheral surface of the ring-shaped scale in the casing 111. Also in this rotary encoder 110, the detecting sensor detects a relative rotational angular position between the scale rotating and the detecting sensor, and the position calculator calculates a current rotational angular position of the scale with respect to a predetermined zero-point angular position (rotation zero point) based on the relative rotational angular position detected by the detecting sensor and outputs a signal (data) relating to the calculated rotational angular position to the outside.

The unit-type rotary encoder 110 configured as described above is, for example, used in a device such as a motor, in which a rotary body as a detection target is contained in an appropriate casing and a rotary shaft of the rotary body is extended from the casing, to detect a rotational angular position or a rotational speed of the rotary body, the rotary encoder 110 being used in a state of being attached to the casing with the scale being coupled to the rotary shaft.

A linear encoder as described above has a similar configuration to those of the rotary encoders described above, except that the scale is linearly provided. Either the scale or the detecting sensor is disposed on a moving body. The detecting sensor detects a relative positional relation between the scale and the detecting sensor, and the position calculator calculates a relative position between the scale and the detecting sensor with respect to a predetermined zero point based on the detected relative positional relation.

Each encoder described above is conventionally used for, for example, position control of a moving body (including a rotary body); an appropriate controller controls a driving device for driving the moving body while detecting a position of the moving body with the encoder, thereby position-controlling the moving body to a target position.

SUMMARY OF THE DISCLOSURE

In recent years, performance of an encoder as described above has been improved; consequently, the detection speed of the encoder is much faster than the processing speed of the controller. Specifically, the encoder is capable of position detection with several tens of MHz (e.g., 20 MHz ($5\times10^{-2}$ μs)), while the processing speed of the controller is several KHz to a dozen or two dozen KHz (e.g., 10 KHz (100 μs)). Simply stated using a specific example, the encoder performs 20 million position detections in one second, while the controller refers to only 10 thousand pieces of position data in one second.

Accordingly, the encoder in the specific example outputs position data to the controller at time intervals of 100 μs; however, conventionally, the encoder is not configured to output a mean value of the 2,000 pieces of position data detected in 100 μs, but configured to output a mean value of the last several tens of pieces of position data. The reasons for such a configuration are that using the mean value of the position data detected in 100 μs corresponds to the controller performing control by referring to position data preceding the time of data output by 50 μs, which prevents accurate position control, and that it is believed that referring to the mean value of the last several tens of pieces of position data allows the controller to refer to position data close to the output time point, which enables precise and accurate position control.

However, the last several tens of pieces of position data are very small in number as compared with the 2000 pieces of position data obtained in 100 μs; therefore, there is another problem that, if the last position data is under the effect of noise, it is difficult to remove the noise and the controller therefore cannot perform accurate position control.

The encoder detects a large number of pieces of position data, i.e., 2000 pieces of position data, in 100 μs; the obtained position data can be effectively used if it is possible to estimate more accurate position data at the output time point based on the position data, which is preferable.

The present disclosure has been achieved in view of the above-described circumstances, and an object thereof is to provide an encoder which can accurately estimate position data at an output time point by using a broader range of position data obtained between outputs executed at predetermined intervals than in the conventional art.

The present disclosure, for solving the above-described problem, relates to an encoder including a scale having a pattern to be detected corresponding to graduations, a detecting sensor detecting the pattern to be detected of the scale and outputting a detection signal corresponding to the detected pattern to be detected, and a position calculator calculating a relative positional relation between the scale and the detecting sensor at predetermined sampling intervals based on the detection signal output from the detecting sensor, the encoder further including:

a position data storage storing therein position data calculated by the position calculator; and a position estimator calculating relative position data between the scale and the detecting sensor at a calculation-target time point based on the position data stored in the position data storage and outputting the calculated position data, the position estimator being configured to calculate position data at a first time point and position data at a second time point and calculate the position data at the calculation-target time point based on the calculated position data at the first time point and the calculated position data at the second time point, the first time point and the second time point each preceding the calculation-target time point by a predetermined time, and the position estimator being further configured to process, by means of a digital filter, position data obtained in a first time width centered on the first time point to thereby calculate the position data at the first time point as a representative value of the first time width, and configured to process, by means of the digital filter, position data obtained in a second time width centered on the second time point to thereby calculate the position data at the second time point as a representative value of the second time width.

In the encoder according to this aspect (first aspect), relative position data between the scale and the detecting sensor is calculated at predetermined sampling intervals by the position calculator, and the calculated position data is stored into the position data storage.

Based on the position data stored in the position data storage, relative position data between the scale and the detecting sensor at a time point (calculation-target time point) set at predetermined time intervals is calculated (estimated) by the position estimator, and the calculated position data is output to the outside. Note that the calculation-target time point is a time point a predetermined time later than the processing (estimation) time point; the estimation being executed at a time point preceding the calculation-target time point by the predetermined time.

In this process, the position estimator calculates position data at a first time point preceding the calculation-target time point by a predetermined time and calculates position data at a second time point preceding the calculation-target time point by a predetermined time, and calculates the position data at the calculation-target time point based on the calculated position data at the first time point and the calculated position data at the second time point. Note that the position data at the first time point, which is a representative value of the first time width, is calculated by processing, by means of a digital filter, position data obtained in the first time width centered on the first time point, and the position data at the second time point, which is a representative value of the second time width, is calculated by processing, by the digital filter, position data obtained in the second time width centered on the second time point. Further, it is preferable that the first and second time points are set between the present calculation-target time point and the previous calculation-target time point, and it is preferable that either one of the first and second time points is set at a time point as close to the processing time point as possible.

Thus, this encoder is configured to estimate relative position data between the scale and the detecting sensor at the calculation-target time point; therefore, accurate position data without time delay can be obtained. For example, using such position data for position control can achieve accurate position control in that time delay is less likely to occur.

Further, this encoder is configured to use the position data at the first time point obtained by processing the position data obtained in the first time width centered on the first time point and the position data at the second time point obtained by processing the position data obtained in the second time width centered on the second time point to estimate the relative position data between the scale and the detecting sensor at the calculation-target time point (output time point); therefore, the used range of the position data detected by the position calculator can be set to be broader than in the conventional art, in other words, more position data can be used than in the conventional art, which makes it possible to more accurately calculate (estimate) the position data at the output time point.

Note that the representative value is, literally, position data as a representative of the corresponding time width, which is a value obtained by processing position data in the time width by means of a digital filter. Further, the digital filter means a function of extracting a specific component by an arithmetic operation using an algorithm or the like. Examples of the digital filter include a low-pass filter, a high-pass filter, a band-pass filter, a band-stop filter, and an averaging filter; the digital filter herein means a digital filter in a broad sense, which also includes a processing for obtaining a mean value, a maximum value, a minimum value, or the like.

In the first aspect, the position estimator may be configured to calculate the position data P(t) at the calculation-target time point t in accordance with an equation below:

$$P(t)=P(t_1)+v_1\times(t-t_1),$$

$$\text{with } v_1=(P(t_1)-P(t_2))/(t_1-t_2),$$

where:

the time point t is a time point after an elapse of a predetermined time from a predetermined time point;

$t_1$ is the first time point preceding the time point t by a predetermined time;

$P(t_1)$ is the position data at the first time point $t_1$, which is a representative value of the first time width centered on the first time point $t_1$, obtained by processing by means of the digital filter the position data obtained in the first time width;

$t_2$ is the second time point preceding the time point t by a predetermined time, $t_1>t_2$; and $P(t_2)$ is the position data at the second time point $t_2$, which is a representative value of the second time width centered on the second time point $t_2$, obtained by processing by means of the digital filter the position data obtained in the second time width.

In the equation above, $v_1$ is a relative moving speed of the scale and detecting sensor between the first time point $t_1$ and the second time point $t_2$, and the position data P(t) at the calculation-target time point t is a position (data) which the scale and the detecting sensor are estimated to reach when they move at the moving speed $v_1$ from the first time point $t_1$ until the time point t.

Further, according to another aspect (second aspect) of the present disclosure, the position estimator is configured to, besides the processing in the first aspect, calculate position data at a third time point preceding the calculation-target time point by a predetermined time, and configured to calculate the position data at the calculation-target time point based on the calculated position data at the first time point, the calculated position data at the second time point, and the calculated position data at the third time point, and the position estimator is further configured to process, by means of the digital filter, position data obtained in a third time width centered on the third time point to thereby calculate the position data at the third time point as a representative value of the third time point.

In the second aspect, the position data at the output time point can be calculated using more position data than in the first aspect, which makes it possible to more accurately calculate the position data at the output time point.

Further, in the second aspect, the position estimator may be configured to calculate the position data P(t) at the calculation-target time point t in accordance with an equation below:

$$P(t)=P(t_1)+v_1 \times (t-t_1)+(\alpha_1 \times (t-t_1)^2)/2,$$

with $v_1=(P(t_1)-P(t_2))/(t_1-t_2)$, $v_2=(P(t_2)-P(t_3))/(t_2-t_3)$, and $\alpha_1=2(v_1-v_2)/(t_1-t_3)$, where:

$t_3$ is the third time point preceding the time point t by a predetermined time, $t_2 > t_3$; and $P(t_3)$ is the position data at the third time point $t_3$, which is a representative value of the third time width centered on the third time point $t_3$, obtained by processing by means of the digital filter the position data obtained in the third time width.

The above equation calculates relative position data between the scale and the detecting sensor at the output time point for a case where the scale and the detecting sensor move with acceleration a1. The last term of the equation is a correction term taking into account the influence of the acceleration.

Thus, in the encoder according to this aspect, the position estimator calculates the position data at the output time point taking into account the acceleration, which makes it possible to more accurately calculate the position data at the output time point.

Further, according to further another aspect (third aspect) of the present disclosure, the position estimator is configured to, besides the processing in the second aspect, calculate position data at a fourth time point preceding the calculation-target time point by a predetermined time, and configured to calculate the position data at the calculation-target time point based on the calculated position data at the first time point, the calculated position data at the second time point, the calculated position data at the third time point, and the calculated position data at the fourth time point, and the position estimator is further configured to process, by means of the digital filter, position data obtained in a fourth time width centered on the fourth time point to thereby calculate the position data at the fourth time point as a representative value of the fourth time point.

In the third aspect, the position data at the output time point can be calculated using more position data than in the second aspect, which makes it possible to more accurately calculate the position data at the output time point.

Further, in the third aspect, the position estimator may be configured to calculate the position data P(t) at the calculation-target time point t in accordance with an equation below:

$$P(t)=P(t_1)+v_1 \times (t-t_1)+(\alpha_1 \times (t-t_1)^2)/2+(j \times (t-t_1)^3)/6,$$

with $v_1=(P(t_1)-P(t_2))/(t-t_2)$, $v_2=(P(t_2)-P(t_3))/(t_2-t_3)$, $v_3=(P(t_3)-P(t_4))/(t_3-t_4)$, $\alpha_1=2(v_1-v_2)/(t_1-t_3)$, $\alpha_2=2(v_2-v_3)/(t_2-t_4)$, and $j=(\alpha_1-\alpha_2)/(t_2-t_3)$, where:

$t_4$ is the fourth time point preceding the time point t by a predetermined time, $t_3 > t_4$; and $P(t_4)$ is the position data at the fourth time point $t_4$, which is a representative value of the fourth time width centered on the fourth time point $t_4$, obtained by processing by means of the digital filter the position data obtained in the fourth time width.

The above equation calculates relative position data between the scale and the detecting sensor at the output time point for a case where the scale and the detecting sensor move with jerk j. The last term of the equation is a correction term taking into account the influence of the jerk.

Thus, in the encoder according to this aspect, the position estimator calculates the position data at the output time point taking into account the jerk, which makes it possible to still more accurately calculate the position data at the output time point.

Further, according to further another aspect (fourth aspect) of the present disclosure, the position estimator is configured to, besides the processing in the first aspect, calculate position data at a third time point preceding the calculation-target time point by a predetermined time and calculate position data at a fourth time point preceding the calculation-target time point by a predetermined time, and configured to calculate the position data at the calculation-target time point based on the calculated position data at the first time point, the calculated position data at the second time point, the calculated position data at the third time point, and the calculated position data at the fourth time point, the position estimator is further configured to process, by means of the digital filter, position data obtained in a third time width centered on the third time point to thereby calculate the position data at the third time point as a representative value of the third time width, and configured to process, by means of the digital filter, position data obtained in a fourth time width centered on the fourth time point to thereby calculate the position data at the fourth time point as a representative value of the fourth time width, and the third time width and the fourth time width are each sufficiently larger than the first time width and the second time width.

With the thus-configured encoder, for example, the position data at the calculation-target time point can be estimated based on the position data at the first time point and the position data at the second time point, and the position data at the calculation-target time point also can be estimated based on the position data at the third time point and the position data at the fourth time point. Based on these two estimated values, a more accurate estimated value can be calculated.

Specifically, in the fourth aspect, the position estimator is configured to calculate the position data P(t) at the calculation-target time point t in accordance with equations below:

in a case of $\Delta \leq R, P(t) = P_b(t) + \Delta^2/R$, and in a case of $\Delta > R, P(t) = P_a(t)$, with $\Delta = P_a(t) - P_b(t)$, $P_a(t) = P(t_1) + v_a \times (t - t_1)$, $v_a = (P(t_1) - P(t_2))/(t_1 - t_2)$, $P_b(t) = P(t_3) + v_b \times (t - t_3)$, and $v_b = (P(t_3) - P(t_4))/(t_3 - t_4)$, where:
$t_1 > t_3$, the third time width and the fourth time width each have a sufficiently larger width than the first time width and the second time width, and R is a predetermined reference value.

In this aspect, a rotational angular position $P_a(t)$ at the time point t is estimated based on the position data $P(t_1)$ at the first time point $t_1$ and the position data $P(t_2)$ at the second time point $t_2$. Further, a rotational angular position $P_b(t)$ at the time point t is estimated based on the rotational angular position $P(t_3)$ at the third time point $t_3$ and the rotational angular position $P(t_4)$ at the fourth time point $t_4$.

Based on the two estimated values $P_a(t)$ and $P_b(t)$, a difference value $\Delta$ between them is calculated. In a case where the difference value $\Delta$ exceeds a predetermined reference value R (in a case of $\Delta > R$), a determination is made that the estimated values $P_a(t)$ and $P_b(t)$ are under the influence of noise, and $P_a(t)$ that is calculated based on the rotational angular position data close to the estimation time point is designated as the estimated value P(t). On the other hand, in a case where the difference value $\Delta$ is equal to or smaller than the reference value R (in a case of $\Delta \leq R$), a determination is made that the estimated value $P_a(t)$ and $P_b(t)$ are less under the influence of noise, and the estimated value P(t) is estimated based on $P_a(t)$ and $P_b(t)$.

Thus, with this aspect, the estimated value P(t) can be calculated taking into account the influence of noise, which makes it possible to more accurately calculate (estimate) the rotational angular position at the output time point.

As described above, the encoder according to the present disclosure is configured to estimate relative position data between the scale and the detecting sensor at the calculation-target time point; therefore, accurate position data without time delay can be obtained. For example, using such position data for position control can achieve accurate position control in that time delay is less likely to occur.

Further, the encoder is configured to use the position data at the first time point obtained by processing by means of a digital filter the position data obtained in the first time width centered on the first time point and the position data at the second time point obtained by processing by means of the digital filter the position data obtained in the second time width centered on the second time point to estimate the relative position data between the scale and the detecting sensor at the calculation-target time point (output time point); therefore, the used range of the position data detected by the position calculator can be set to broader than in the convention art, in other words, more position data can be used than in the conventional art, which makes it possible to more accurately calculate (estimate) the position data at the output time point.

BRIEF DESCRIPTION OF THE DRAWINGS

For a more complete understanding of the disclosed methods and apparatus, reference should be made to the embodiment illustrated in greater detail on the accompanying drawings, wherein.

DETAILED DESCRIPTION

Figure 1:
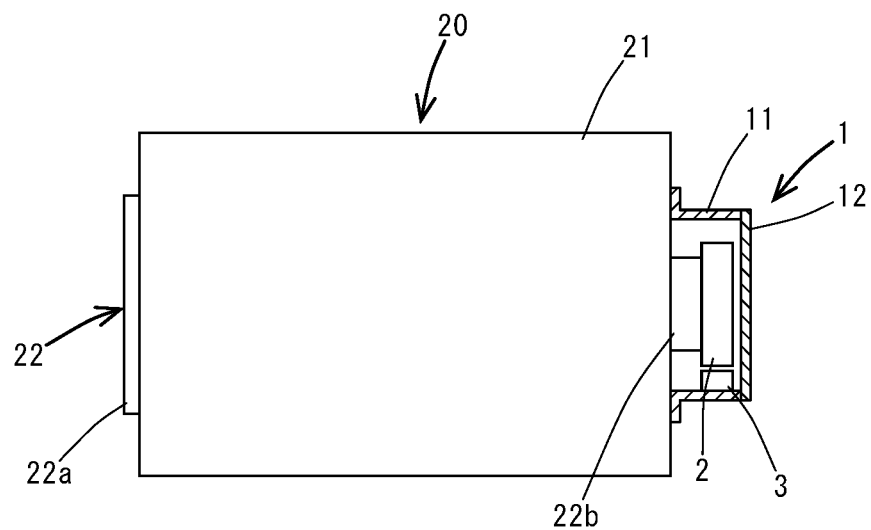
FIG. 1 is a front view, partly in cross-section, of a schematic configuration of a rotary encoder according to an embodiment of the present disclosure and a spindle unit to which the rotary encoder is attached.
Figure 2:
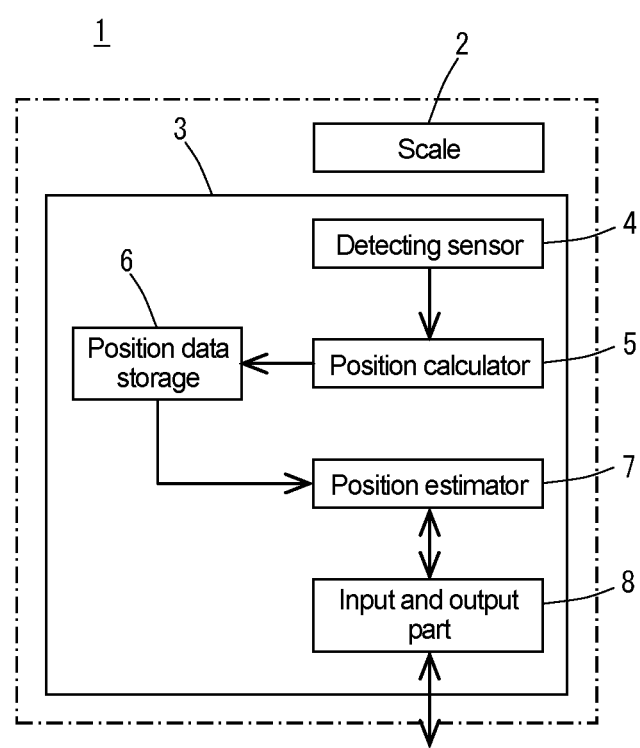
FIG. 2 is a block diagram showing a schematic configuration of the rotary encoder according to the embodiment.

Hereinafter, a specific embodiment of the present disclosure will be described with reference to the drawings. FIG. 1 is a front view, partly in cross-section, of a schematic configuration of a rotary encoder according to the embodiment and a spindle unit to which the rotary encoder is attached, and FIG. 2 is a block diagram showing a schematic configuration of the rotary encoder according to the embodiment.

As shown in FIG. 1, the rotary encoder 1 according to this embodiment is provided on a rear end (the right-side end in the figure) of the spindle unit 20. The spindle unit 20 is composed of a spindle 22, a housing 21 by which the spindle 22 is rotatably supported, a spindle motor (not shown) provided in the housing 21 and rotating the spindle 22, and other components. The spindle 22 has a front end portion 22a protruding forward from a front end of the housing 21 and has a rear end portion 22b protruding backward from a rear end of the housing 21.

The rotary encoder 1 is provided on the spindle unit 20 to detect a rotational angular position of the spindle 22 that constitutes the spindle unit 20. As shown in FIGS. 1 and 2, the rotary encoder 1 is a so-called separate-type rotary encoder that is composed of a scale 2 and a detecting head 3.

Figure 5:
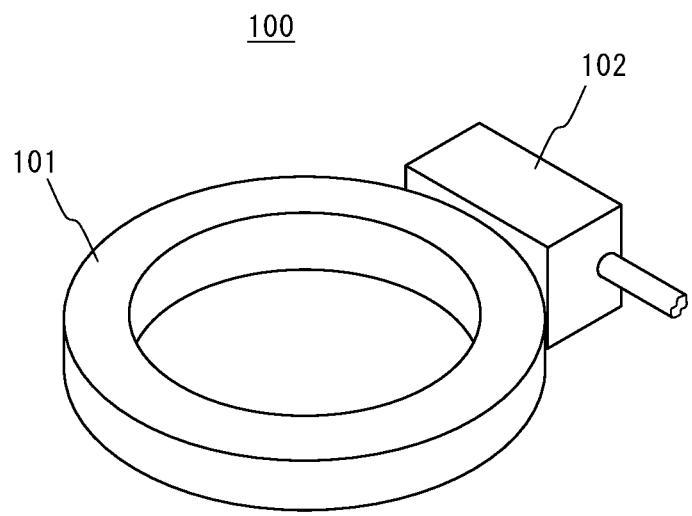
FIG. 5 is a perspective view of a typical separate-type rotary encoder.
Figure 6:
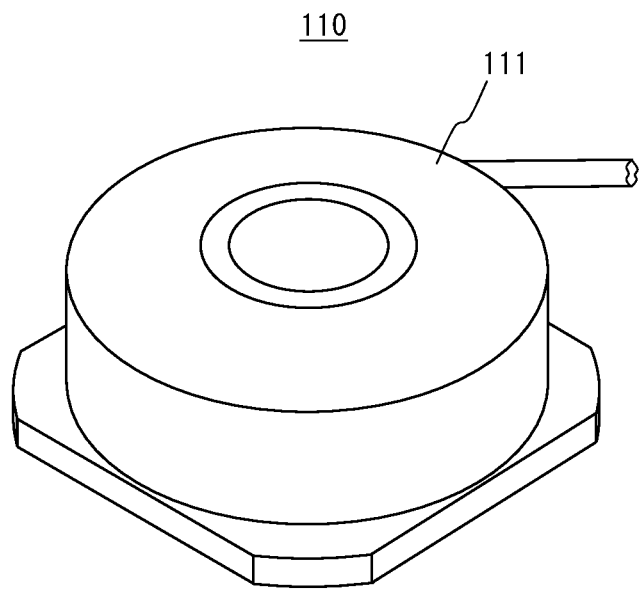
FIG. 6 is a perspective view of a typical unit-type rotary encoder.

The scale 2 has a configuration similar to that of the ring-shaped scale 101 shown in FIG. 5. The scale 2 has linear teeth as a pattern to be detected formed at predetermined pitch intervals on an outer peripheral surface thereof, the teeth being parallel to a center axis of the scale 2. As shown in FIG. 1, the scale 2 is attached to the rear end portion 22b of the spindle 22 to be coaxial with the spindle 22.

The detecting head 3 is attached to the rear end of the housing 21 via an attaching member 11 to face the outer peripheral surface of the scale 2 rotating, with a certain distance therebetween. The attaching member 11 is cylindrical in shape and the detecting head 3 is fixed to an inner peripheral surface of the attaching member 11. An opening of the attaching member 11 is closed by a lid 12.

As shown in FIG. 2, the detecting head 3 is composed of a detecting sensor 4, a bias magnet, which is not shown in the drawings, a position calculator 5, a position data storage 6, a position estimator 7, and an input and output part 8. Note that the position calculator 5, the position data storage 6, the position estimator 7, and the input and output part 8 are each implemented by an electronic device having an appropriate electronic circuit.

Note that operation of the spindle unit 20 is controlled by a controller, which is not shown in the drawings, based on the rotational angular position of the spindle 22 detected by the rotary encoder 1.

The bias magnet (not shown) produces a bias magnetic field. The detecting sensor 4 detects a relative rotational angular position between the scale 2 and the detecting sensor 4 at predetermined time intervals (sampling intervals) (for example, 20 MHz as mentioned above) based on a variation (variation drawing a sine curve) of the bias magnetic field, which is caused by rotation of the scale 2 having the linear teeth. The position calculator 5 calculates a current rotational angular position of the scale 2 with respect to a predetermined zero-point angular position (rotation zero point) based on the relative rotational angular position detected by the detecting sensor 4, and stores the calculated rotational angular position data into the position data storage 6. Note that the rotation zero point also represents a relative positional relation between the scale 2 and the detecting sensor 4.

The position estimator 7 calculates (estimates) a rotational angular position of the scale 2 at a calculation-target time point based on the rotational angular position data stored in the position data storage 6, and outputs the calculated (estimated) rotational angular position to the outside (for example, the controller) through the input and output part 8. Note that the calculation-target time point is set at predetermined time intervals, which time interval is much longer than the sampling interval and is set to be equal to an operation speed of the destination of the estimated rotational angular position, for example, the controller (for example, 10 kHz as mentioned above). Further, the calculation-target time point is a time point a predetermined time later than the processing (estimation) time point, the estimation being executed at a time point preceding the calculation-target time point by the predetermined time. The position data storage 6 stores therein at least the rotational angular position data for a time width needed for the calculation in the position estimator 7.

The position estimator 7 calculates the rotational angular position P(t) of the scale 2 in accordance with Equation 1 below.

The position estimator 7 calculates the rotational angular position P(t) of the scale 2 in accordance with Equation 1 below.

$$P(t)=P(t_1)+v_1\times(t-t_1)+(\alpha_1\times(t-t_1)^2)/2+(j\times(t-t_1)^3)/6,$$

with $$v_1=(P(t_0)-P(t_2))/(t-t_2),$$

$$v_2=(P(t_2)-P(t_3))/(t_2-t_3),$$

$$v_3=(P(t_3)-P(t_4))/(t_3-t_4),$$

$$\alpha_1=2(v_1-v_2)/(t_1-t_3),$$

$$\alpha_2=2(v_2-v_3)/(t_2-t_4), \text{ and}$$

$$j=(\alpha_1-\alpha_2)/(t_2-t_3). \quad \text{(Equation 1)}$$

Figure 3:
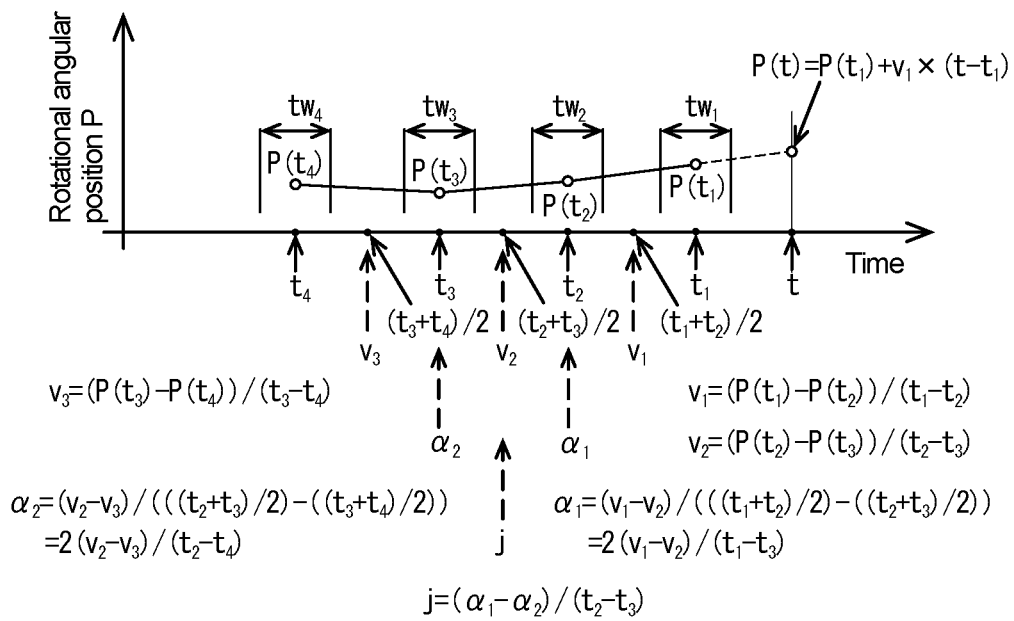
FIG. 3 is an illustration for explaining a processing in the rotary encoder according to the embodiment.

The time point t is a time point after an elapse of a predetermined time from a predetermined time point (that is, the estimation time point). As shown in FIG. 3, the time point $t_1$ is a first time point that precedes the time point t by a predetermined time. $P(t_1)$ is rotational angular position data at the first time point $t_1$, which is a mean value obtained by processing, by means of an averaging filter that is a digital filter, rotational angular position data obtained in a first time width $tw_1$ centered on the first time point $t_1$, i.e., a representative value of the first time width two. The time point $t_2$ is a second time point that precedes the time point t by a predetermined time, $t_1>t_2$. $P(t_2)$ is rotational angular position data at the second time point $t_2$, which is a mean value obtained by processing, by means of the averaging filter, rotational angular position data obtained in a second time width $tw_2$ centered on the second time point $t_2$, i.e., a representative value of the second time width $tw_2$. The time point $t_3$ is a third time point that precedes the time point t by a predetermined time, $t_2>t_3$. $P(t_3)$ is rotational angular position data at the third time point $t_3$, which is a mean value obtained by processing, by means of the averaging filter, rotational angular position data obtained in a third time width $tw_3$ centered on the third time point $t_3$, i.e., a representative value of the third time width $tw_3$. The time point $t_4$ is a fourth time point that precedes the time point t by a predetermined time, $t_3>t_4$. $P(t_4)$ is rotational angular position data at the fourth time point $t_4$, which is a mean value obtained by processing, by means of the averaging filter, rotational angular position data obtained in a fourth time width $tw_4$ centered on the fourth time point $t_4$, i.e., a representative value of the fourth time width $tw_4$.

As described above, $P(t_1)$, the first term of Equation 1, is rotational angular position data at the first time point $t_1$, which is a mean value of rotational angular position data obtained in the first time width $tw_1$ centered on the first time point $t_1$. In this embodiment, the rotational angular position P(t) of the scale 2 at the calculation-target time point t is estimated based on $P(t_1)$.

Specifically, the rotational angular position P(t) is estimated under the assumption that, with the rate of change (in other words, rotational speed of the scale 2) between the rotational angular position $P(t_1)$ at the first time point $t_1$ and the rotational angular position $P(t_2)$ at the second time point $t_2$ being $v_1$ (the second term of Equation 1), the scale 2 rotates at the same rotational speed as the rotational speed $v_1$ from the first time point $t_1$ until the estimation time point t. Therefore, the second term of Equation 1 means an amount of rotational movement of the scale 2 estimated based on the rotational speed $v_1$ of the scale 2.

Further, the third term of Equation 1 is a correction term for a case where the scale 2 moves with acceleration. As shown in FIG. 3, with the mean rotational speed of the scale 2 during the period from the third time point $t_3$ until the second time point $t_2$, i.e., the rotational speed of the scale 2 at a time point of $(t_2+t_3)/2$, being $v_2$ and with the mean rotational speed of the scale 2 during the period from the second time point $t_2$ until the first time point $t_1$, i.e., the rotational speed of the scale 2 at a time point of $(t_1+t_2)/2$, being $v_1$, the rate of change of the rotational speed, that is, acceleration $\alpha_1$, during the period from the time point of $(t_2+t_3)/2$ until the time point of $(t_1+t_2)/2$ is, as described above, $\alpha_1=2(v_1-v_2)/(t_1-t_3)$.

The influence (value) of the acceleration $\alpha_1$ on the rotational angular position during the period from the first time point $t_1$ until the estimation time point t can be calculated by Equation: $(\alpha_1 \times (t-t_1)^2)/2$, the equation being obtained by second-order integration of the acceleration $\alpha_1$ with respect to time ($t_1 \to t$).

Further, the fourth term of Equation 1 is a correction term for a case where the scale 2 moves with jerk. As shown in FIG. 3, with the mean rotational speed of the scale 2 during the period from the fourth time point $t_4$ until the third time point $t_3$, i.e., the rotational speed of the scale 2 at a time point of $(t_3+t_4)/2$, being $v_3$ and with the mean rotational speed of the scale 2 during the period from the third time point $t_3$ until the second time point $t_2$, i.e., the rotational speed of the scale 2 at a time point of $(t_2+t_3)/2$, being $v_2$, the rate of change of the rotational speed, that is, acceleration $\alpha_2$, during the period from the time point of $(t_3+t_4)/2$ until the time point of $(t_2+t_3)/2$ is, as described above, $\alpha_2=2(v_2-v_3)/(t_2-t_4)$.

Therefore, with reference also to the acceleration $\alpha_t$ calculated as described above, the rate of change of the acceleration of the scale 2, that is, jerk j, during the period from the third time point $t_3$ until the second time point $t_2$ is, as described above, $j=(\alpha_1-\alpha_2)/(t_2-t_3)$.

The influence (value) of the jerk j on the rotational angular position during the period from the first time point $t_1$ until the estimation time point t can be calculated by Equation: $(j \times (t-t_1)^3)/6$, the equation being obtained by third-order integration of the jerk j with respect to time ($t_1 \to t$).

In the rotary encoder 1 according to this embodiment having the above-described configuration, the detecting sensor 4 detects a relative rotational angular position between the scale 2 and the detecting sensor 4 at predetermined sampling intervals, and the position calculator 5 calculates a current rotational angular position of the scale 2 with respect to a predetermined zero-point angular position (rotation zero point) based on the detected relative rotational angular position, the calculated rotational angular position data being stored into the position data storage 6.

Further, the position estimator 7 calculates (estimates) a rotational angular position of the scale 2 at the calculation-target time point based on the rotational angular position data stored in the position data storage 6, and outputs the calculated (estimated) rotational angular position to the outside (for example, the controller) through the input and output part 8. In this process, the position estimator 7 calculates the rotational angular position of the scale 2 in accordance with Equation 1 described above.

Thus, the rotary encoder 1 according to this embodiment is configured to estimate a relative rotational angular position between the scale 2 and the detecting sensor 4 at the calculation-target time point; therefore, highly reliable rotational angular position without time delay can be obtained. For example, using such rotational angular position data for position control can achieve accurate and highly reliable position control in that time delay is less likely to occur.

Further, in this rotary encoder 1, the position estimator 7 uses the rotational angular position data obtained in the first time width $tw_1$, the rotational angular position data obtained in the second time width $tw_2$, the rotational angular position data obtained in the third time width $tw_3$, and the rotational angular position data obtained in the fourth time width $tw_4$ to estimate the relative rotational angular position between the scale 2 and the detecting sensor 4 at the calculation-target time point (output time point). Therefore, the used range of the rotational angular position data detected by the position calculator 5 can be set to be broader than in the conventional art, in other words, more rotational angular position data can be used than in the conventional art, which makes it possible to more accurately calculate (estimate) the rotational angular position at the output time point.

Further, the rotary encoder 1 according to this embodiment is configured to, in the case where the scale 2 and the detecting sensor 4 move with acceleration and jerk, calculate the rotational angular position taking into account the acceleration and the jerk, which makes it possible to still more accurately calculate (estimate) the rotational angular position at the output time point.

Hereinbefore, a specific embodiment of the present disclosure has been described. However, the present disclosure is not limited to the embodiment and can be implemented in other manners.

For example, the position estimator 7 may be configured to calculate the rotational angular position P(t) of the scale 2 in accordance with Equations 2 and 3 below instead of Equation 1 described above.

In a case of $\Delta \leq R, P(t)=P_b(t)+\Delta 2/R$, and  (Equation 2)

In a case of $\Delta > R, P(t)=P_a(t)$, with $\Delta = P_a(t) - P_b(t)$, $P_a(t) = P(t_1) + v_a \times (t-t_1)$, $v_a = (P(t_1) - P(t_2))/(t_1 - t_2)$, $P_b(t) = P(t_3) + v_b \times (t-t_3)$, and $v_b = (P(t_3) - P(t_4))/(t_3 - t_4)$.  (Equation 3)

Figure 4:
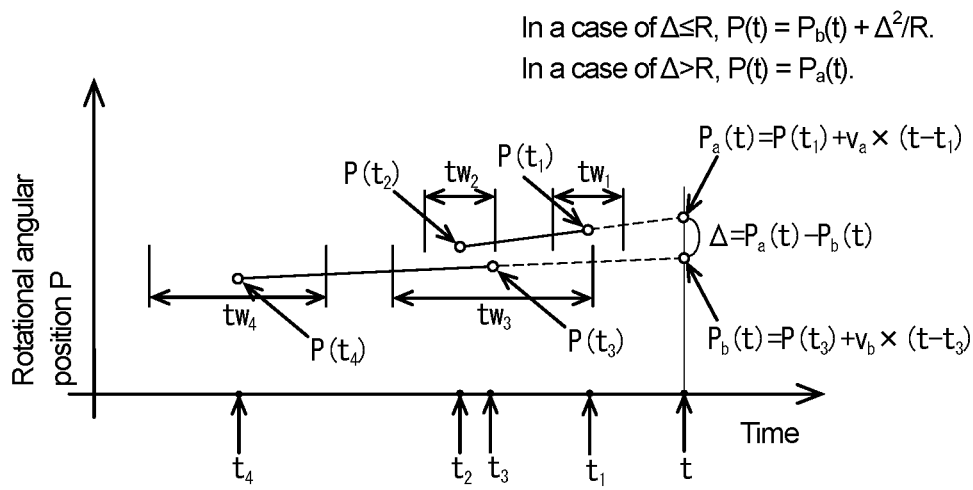
FIG. 4 is an illustration for explaining a processing in a rotary encoder according to another embodiment of the present disclosure.

As shown in FIG. 4, the time point $t_1$ is a first time point that precedes the time point t by a predetermined time. $P(t_1)$ is a rotational angular position at the first time point $t_1$, which is a mean value obtained by processing, by means of an averaging filter that is a digital filter, rotational angular position data obtained in a first time width $tw_1$ centered on the first time point $t_1$, i.e., a representative value of the first time width $tw_1$. The time point $t_2$ is a second time point that precedes the time point t by a predetermined time, $t_1 > t_2$. $P(t_2)$ is a rotational angular position at the second time point $t_2$, which is a mean value obtained by processing, by means of the averaging filter, rotational angular position data obtained in a second time width $tw_2$ centered on the second time point $t_2$, i.e., a representative value of the second time width $tw_2$. The time point $t_3$ is a third time point that precedes the time point t by a predetermined time. $P(t_3)$ is a rotational angular position at the third time point $t_3$, which is a mean value obtained by processing, by means of the averaging filter, rotational angular position data obtained in a third time width $tw_3$ centered on the third time point $t_3$, i.e., a representative value of the third time width $tw_3$. The time point $t_4$ is a fourth time point that precedes the time point t by a predetermined time, $t_3 > t_4$. $P(t_4)$ is a rotational angular position at the fourth time point $t_4$, which is a mean value obtained by processing, by means of the averaging filter, rotational angular position data obtained in a fourth time width $tw_4$ centered on the fourth time point $t_4$, i.e., a representative value of the fourth time width $tw_4$. Further, $t_1 > t_3$, and the third time width $tw_3$ and the fourth time width $tw_4$ each have a sufficiently larger width than the first time width $tw_1$ and the second time width $tw_2$. R is a predetermined reference value.

As shown in FIG. 4, in this embodiment, a rotational angular position $P_a(t)$ at the time point t is estimated based on the rotational angular position $P(t_1)$ at the first time point $t_1$ and the rotational angular position $P(t_2)$ at the second time point $t_2$. Further, a rotational angular position $P_b(t)$ at the time point t is estimated based on the rotational angular position $P(t_3)$ at the third time point $t_3$ and the rotational angular position $P(t_4)$ at the fourth time point $t_4$.

Based on the two estimated values $P_a(t)$ and $P_b(t)$, a difference value $\Delta$ between them is calculated. In a case where the difference value $\Delta$ exceeds the predetermined reference value R (in a case of $\Delta>R$), a determination is made that the estimated values $P_a(t)$ and $P_b(t)$ are under the influence of noise, and $P_a(t)$ that is calculated based on the rotational angular position data close to the estimation time point is designated as the estimated value P(t) (Equation 3). On the other hand, in a case where the difference value $\Delta$ is equal to or smaller than the reference value R (in a case of $\Delta \leq R$), a determination is made that the estimated values $P_a(t)$ and $P_b(t)$ are less under the influence of noise, and the estimated value P(t) is estimated based on $P_a(t)$ and $P_b(t)$.

Thus, with the position estimator 7 according to this embodiment, the estimated value P(t) can be calculated taking into account the influence of noise, which makes it possible to more accurately calculate (estimate) the rotational angular position at the output time point.

Further, in the above embodiment, a separate-type rotary encoder is presented by way of example; the present disclosure is not limited to such an encoder and can be embodied by other types of encoders, which include not only a unit-type rotary encoder but also a linear encoder, and further include encoders using various types of detection, such as an optical encoder and a magnetic encoder.

Further, the above embodiment is configured to calculate each of the mean values, i.e., the representative values, of the first time width $tw_1$, second time width $tw_2$, third time width $tw_3$, and fourth time width $tw_4$ by processing, by means of an averaging filter, rotational angular position data obtained in the time width; however, the present disclosure is not limited thereto. Maximum values or minimum values may be used as the representative values, and the digital filter for calculating the representative values may employ various types of filters, such as a high-pass filter, a low-pass filter, a band-pass filter, and a band-stop filter, depending on the representative values.

Further, in each of the above embodiments, it is preferable that the first through fourth time points $t_1$ through $t_4$ are set between the present calculation-target time point and the previous calculation-target time point. That is to say, it is preferable that the rotational position data used for the present calculation is data obtained after the previous calculation-target time point. Further, it is preferable that the first time point $t_1$ is set at a time point as close to the present calculation-target time point as possible.

Note that the above description of the embodiments is illustrative in all aspects and is not limiting. One skilled in the art would be able to make variations and modifications as appropriate. The scope of the present disclosure is not defined by the above-described embodiments, but is defined by the appended claims. Further, the scope of the present disclosure encompasses changes made from the embodiments within the scope equivalent to the scope of the claims.

What is claimed is:

1. An encoder comprising:
a scale having a pattern to be detected corresponding to graduations;
a detecting sensor detecting the pattern to be detected of the scale and outputting a detection signal corresponding to the detected pattern to be detected; and
a position calculator calculating a relative positional relation between the scale and the detecting sensor at predetermined sampling intervals based on the detection signal output from the detecting sensor,
the encoder further comprising:
a position data storage storing therein position data calculated by the position calculator; and
a position estimator estimating relative position data between the scale and the detecting sensor at a calculation-target time point based on the position data stored in the position data storage and outputting the estimated position data,
the calculation-target time point being a time point later by a predetermined time than a time point when the position estimator executes estimation,
the position estimator being configured to calculate position data at a first time point and position data at a second time point and estimate the position data at the calculation-target time point based on the calculated position data at the first time point and the calculated position data at the second time point, the first time point and the second time point each preceding the calculation-target time point by a predetermined time, and
the position estimator being further configured to, by referring to the position data stored in the position data storage, process, by means of a digital filter, position data calculated by the position calculator during a predetermined first time width centered on the first time point to thereby calculate the position data at the first time point as a representative value in the first time width, and configured to, by referring to the position data stored in the position data storage, process, by means of the digital filter, position data calculated by the position calculator during a predetermined second time width centered on the second time point to thereby calculate the position data at the second time point as a representative value in the second time width.

2. The encoder according to claim 1, wherein the position estimator is configured to estimate the position data P(t) at the calculation-target time point t in accordance with an equation below:

$$P(t)=P(t_1)+v_1\times(t-t_1),$$

with $$v_1=(P(t_1)-P(t_2))/(t_1-t_2),$$

where:
the time point t is a time point later by a predetermined time than the time point when the position estimator executes estimation;
$t_1$ is the first time point, and $P(t_1)$ is the position data at the first time point $t_1$ as the representative value in the first time width centered on the first time point $t_1$, obtained by processing by means of the digital filter the position data calculated by the position calculator during the first time width; and
$t_2$ is the second time point, $t_1>t_2$, and $P(t_2)$ is the position data at the second time point $t_2$ as the representative value in the second time width centered on the second time point $t_2$, obtained by processing by means of the digital filter the position data calculated by the position calculator during the second time width.

3. The encoder according to claim 1, wherein:
the position estimator is further configured to calculate position data at a third time point preceding the calculation-target time point by a predetermined time, and is configured to estimate the position data at the calculation-target time point based on the calculated position data at the first time point, the calculated position data at the second time point, and the calculated position data at the third time point; and
the position estimator is further configured to process, by means of the digital filter, position data calculated by the position calculator during a predetermined third time width centered on the third time point to thereby calculate the position data at the third time point as a representative value in the third time width.

4. The encoder according to claim 3, wherein the position estimator is configured to estimate the position data P(t) at the calculation-target time point t in accordance with an equation below:

$$P(t)=P(t_1)+v_1\times(t-t_1)+(\alpha_1\times(t-t_1)^2)/2,$$

with $$v_1=(P(t_1)-P(t_2))/(t_1-t_2),$$

$$v_2=(P(t_2)-P(t_3))/(t_2-t_3), \text{ and}$$

$$\alpha_1=2(v_1-v_2)/(t_1-t_3),$$

where:
the time point t is a time point later by a predetermined time than the time point when the position estimator executes estimation;
$t_1$ is the first time point, and $P(t_1)$ is the position data at the first time point $t_1$ as the representative value in the first time width centered on the first time point $t_1$, obtained by processing by means of the digital filter the position data calculated by the position calculator during the first time width;
$t_2$ is the second time point, $t_1>t_2$, and $P(t_2)$ is the position data at the second time point $t_2$ as the representative value in the second time width centered on the second time point $t_2$, obtained by processing by means of the digital filter the position data calculated by the position calculator during the second time width; and
$t_3$ is the third time point, $t_2>t_3$, and $P(t_3)$ is the position data at the third time point $t_3$ as the representative value in the third time width centered on the third time point $t_3$, obtained by processing by means of the digital filter the position data calculated by the position calculator during the third time width.

5. The encoder according to claim 3, wherein:
the position estimator is further configured to calculate position data at a fourth time point preceding the calculation-target time point by a predetermined time, and is configured to estimate the position data at the calculation-target time point based on the calculated position data at the first time point, the calculated position data at the second time point, the calculated position data at the third time point, and the calculated position data at the fourth time point; and
the position estimator is further configured to process, by means of the digital filter, position data calculated by the position calculator during a predetermined fourth time width centered on the fourth time point to thereby calculate the position data at the fourth time point as a representative value in the fourth time width.

6. The encoder according to claim 5, wherein the position estimator is configured to estimate the position data P(t) at the calculation-target time point t in accordance with an equation below:

$$P(t)=P(t_1)+v_1-(t-t_1)+(\alpha_1\times(t-t_1)^2)/2+(j\times(t-t_1)^3)/6,$$

with $$v_1=(P(t_1)-P(t_2))/(t_1-t_2),$$

$$v_2=(P(t_2)-P(t_3))/(t_2-t_3),$$

$$v_3=(P(t_3)-P(t_4))/(t_3-t_4),$$

$$\alpha_1=2(v_1-v_2)/(t_1-t_3),$$

$$\alpha_2=2(v_2-v_3)/(t_2-t_4), \text{ and}$$

$$j=(\alpha_1-\alpha_2)/(t_2-t_3),$$

where:
the time point t is a time point later by a predetermined time than the time point when the position estimator executes estimation;
$t_1$ is the first time point, and $P(t_1)$ is the position data at the first time point $t_1$ as the representative value in the first time width centered on the first time point $t_1$, obtained by processing by means of the digital filter the position data calculated by the position calculator during the first time width;
$t_2$ is the second time point, $t_1>t_2$, and $P(t_2)$ is the position data at the second time point $t_2$ as the representative value in the second time width centered on the second time point $t_2$, obtained by processing by means of the digital filter the position data calculated by the position calculator during the second time width;
$t_3$ is the third time point, $t_2>t_3$, and $P(t_3)$ is the position data at the third time point $t_3$ as the representative value in the third time width centered on the third time point $t_3$, obtained by processing by means of the digital filter the position data calculated by the position calculator during the third time width; and
$t_4$ is the fourth time point, $t_3>t_4$, and $P(t_4)$ is the position data at the fourth time point $t_4$ as the representative value in the fourth time width centered on the fourth time point $t_4$, obtained by processing by means of the digital filter the position data calculated by the position calculator during the fourth time width.

7. The encoder according to claim 1, wherein:
the position estimator is further configured to calculate position data at a third time point and position data at a fourth time point, and is configured to estimate the position data at the calculation-target time point based on the calculated position data at the first time point, the calculated position data at the second time point, the calculated position data at the third time point, and the calculated position data at the fourth time point, the third time point and the fourth time point each preceding the calculation-target time point by a predetermined time;
the position estimator is further configured to process, by means of the digital filter, position data calculated by the position calculator during a predetermined third time width centered on the third time point to thereby calculate the position data at the third time point as a representative value in the third time width, and configured to process, by means of the digital filter, position data calculated by the position calculator during a predetermined fourth time width centered on the fourth time point to thereby calculate the position data at the fourth time point as a representative value in the fourth time width; and the third time width and the fourth time width each have a sufficiently larger width than the first time width and the second time width.

8. The encoder according to claim 7, wherein the position estimator is configured to estimate the position data P(t) at the calculation-target time point t in accordance with equations below:

in a case of $\Delta \leq R, P(t) = P_b(t) + \Delta^2/R$, and in a case of $\Delta > R, P(t) = P_a(t)$, with $\Delta = P_a(t) - P_b(t)$, $P_a(t) = P(t_1) + v_a \times (t - t_1)$, $v_a = (P(t_1) - P(t_2))/(t_1 - t_2)$, $P_b(t) = P(t_3) + v_b \times (t - t_3)$, and $v_b = (P(t_3) - P(t_4))/(t_3 - t_4)$, where:
- the time point t is a time point later by a predetermined time than the time point when the position estimator executes estimation;
- $t_1$ is the first time point, and $P(t_1)$ is the position data at the first time point $t_1$ as the representative value in the first time width centered on the first time point $t_1$, obtained by processing by means of the digital filter the position data calculated by the position calculator during the first time width;
- $t_2$ is the second time point, $t_1 > t_2$, and $P(t_2)$ is the position data at the second time point $t_2$ as the representative value in the second time width centered on the second time point $t_2$, obtained by processing by means of the digital filter the position data calculated by the position calculator during the second time width;
- $t_3$ is the third time point, and $P(t_3)$ is the position data at the third time point $t_3$ as the representative value in the third time width centered on the third time point $t_3$, obtained by processing by means of the digital filter the position data calculated by the position calculator during the third time width;
- $t_4$ is the fourth time point, $t_3 > t_4$, and $P(t_4)$ is the position data at the fourth time point $t_4$ as the representative value in the fourth time width centered on the fourth time point $t_4$, obtained by processing by means of the digital filter the position data calculated by the position calculator during the fourth time width;
- $t_1 > t_3$, and the third time width and the fourth time width each have a sufficiently larger width than the first time width and the second time width; and
- R is a predetermined reference value.

9. The encoder according to claim 1, wherein:
the position calculator is configured to calculate a rotational angular position as the relative positional relation between the scale and the detecting sensor based on the detection signal output from the detecting sensor;
the position data storage is configured to store therein rotational angular position data calculated by the position calculator; and
the position estimator is configured to calculate and estimate rotational angular position data as the position data.

* * * * *